(12) United States Patent
Kim

(10) Patent No.: US 6,674,801 B1
(45) Date of Patent: Jan. 6, 2004

(54) CIRCUIT FOR SYNCHRONIZING PICTURE AND METHOD THEREFOR

(75) Inventor: Seong-bong Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/131,890

(22) Filed: Aug. 10, 1998

(30) Foreign Application Priority Data

Aug. 8, 1997 (KR) .............................. 97-37984

(51) Int. Cl.$^7$ .............................. A04B 1/66; H04N 7/12; H04L 12/56
(52) U.S. Cl. .................... 375/240.26; 348/423; 370/389
(58) Field of Search .............................. 348/512, 513, 348/423, 845.2, 845.3, 515, 465, 845.1; 370/474, 389; 375/240.26, 240.27, 240.28, 362, 376; 386/61, 71, 119, 84

(56) References Cited

U.S. PATENT DOCUMENTS 5,396,497 A * 3/1995 Veltman ...................... 348/423
5,521,927 A * 5/1996 Kim et al. .................... 370/474
5,559,999 A * 9/1996 Maturi et al. ................ 370/389
5,588,029 A * 12/1996 Maturi et al. ................ 348/423
5,771,075 A * 6/1998 Rim et al. ................ 348/845.3
5,808,722 A * 9/1998 Suzuki ........................ 348/515
5,815,634 A * 9/1998 Daum et al. ................. 348/423

* cited by examiner

Primary Examiner—Gims Philippe
(74) Attorney, Agent, or Firm—Sughrue Mion, PLLC

(57) ABSTRACT

A picture decoding synchronizing circuit and a picture decoding synchronizing method are provided. When the decoding synchronization is controlled in units of a picture, in a variable length decoder using the transferred PTS and DTS information, the value obtained by adding the previous DTS to an offset is determined to be the DTS value of the current picture, if errors are generated in the transferred PTS and DTS, considering the errors of the transferred bit stream. If no errors are generated in the PTS or DTS, then the transferred PTS and DTS are determined to be the DTS value of the current picture. By controlling the picture decoding using the determined DTS value, the bit buffer does not underflow or overflow and the decoded data is displayed naturally on a screen.

21 Claims, 4 Drawing Sheets

CIRCUIT FOR SYNCHRONIZING PICTURE AND METHOD THEREFOR

BACKGROUND OF THE INVENTION

1. Field of the Invention

The present invention relates to a video decoder, and more particularly, to a circuit for synchronizing a picture for controlling decoding synchronization in units of a picture so as not to underflow or overflow a bit buffer for a variable length decoder (VLD), and a method therefor.

2. Description of the Related Art

In the MPEG-2 (moving picture experts group) system, a picture may be an I (intra-coded) picture, a B (bidirectionally predictive-coded) picture, or a P (predictive-coded) picture. The MPEG-2 video is coded in units of a frame or units of a field. The I picture can be decoded regardless of other pictures. The P picture can be decoded from preceding I or P pictures. The B picture can be decoded from preceding I or P pictures and successive I or P pictures. When the input includes all three types of I, B, and P pictures, it is possible to restore an original picture only by appropriately controlling decoding timing and output timing so the decoding order is different from the output (display) order.

FIG. 1 is a block diagram of a video decoder for describing a conventional picture decoding synchronizing method. In FIG. 1, a packetized elementary stream (PES) decoder 10 parses an input PES stream, outputs a video elementary stream to a bit buffer 20, and outputs a presentation time stamp (PTS) and a decoding time stamp (DTS) to a variable length decoder (VLD) 30. The VLD 30 receives the video elementary stream output from the bit buffer 20 in units of a picture and determines the point of time at which the picture is to be decoded according to the parsed PTS and DTS. When both the PTS and the DTS exist, the DTS is determined to indicate the point in time at which the picture is decoded. When only the PTS exists, the PTS is determined to indicate the point in time at which the picture is decoded.

When the decoding point of time of the picture unit is determined by the VLD 30 using only the PTS and the DTS output from the PES decoder 10, problems occur if the PES stream is damaged by undesirable states such as an error in a transmission channel with respect to the transferred bit stream. If the damaged portion is the PTS or the DTS, the decoding order and the output order do not coincide with the original decoding order and the output order when the picture decoding is synchronized in units of a picture in the VLD 30 according to the damaged PTS and DTS.

In particular, a predetermined number of pictures to be discarded without being decoded is very large or the pictures are held for an extended period of time in the VLD 30 according to the deviation between the original PTS and DTS and the erroneous PTS and DTS. Accordingly, an unattractive result is obtained when the decoded output is displayed on a screen.

SUMMARY OF THE INVENTION

It is an object of the present invention to provide a picture decoding synchronizing circuit, in which a bit buffer does not overflow or underflow because a picture is decoded using a presentation time stamp (PTS) and a decoding time stamp (DTS) if the PTS and DTS are undamaged. If the DTS and PTS are damaged, they are not used in a video decoder.

It is another object of the present invention to provide a picture decoding method in which the PTS and the DTS are used if they are undamaged, and are otherwise not used.

To achieve the first object, there is provided a picture decoding synchronizing circuit, comprising a detector for detecting whether at least one of a presentation time stamp (PTS) and a decoding time stamp (DTS) which are transferred through an input bit stream are distorted by errors, and outputting a detect signal, a determiner for determining an actual DTS value using a transferred PTS and DTS if no errors are detected from the transferred PTS and DTS according to the detect signal, and determining an approximated DTS value using the value obtained by adding the DTS value of a previous picture to a predetermined offset value, if errors an error is detected in at least one of the PTS and DTS, and a decoder for decoding the input bit stream in units of a picture, in synchronization with one of the actual DTS value and the approximated DTS value.

To achieve the second object, there is provided a picture decoding synchronizing method, comprising the steps of (a) determining whether at least one of a presentation time stamp (PTS) and a decoding time stamp (DTS), transferred through an input bit stream, is distorted, (b) determining an actual DTS value using a transferred PTS and the DTS if no error is detected in the transferred PTS and DTS, according to a detect signal, and otherwise, determining an approximated DTS value by adding a DTS value of a previous picture to an offset value, and (c) decoding the input bit stream in units of a picture, in synchronization with one of the actual DTS value and the approximated DTS value.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Hereinafter, preferred embodiments of a picture decoding synchronizing circuit and a picture decoding synchronizing method according to the present invention will be described with reference to the attached drawings.

Figure 1:
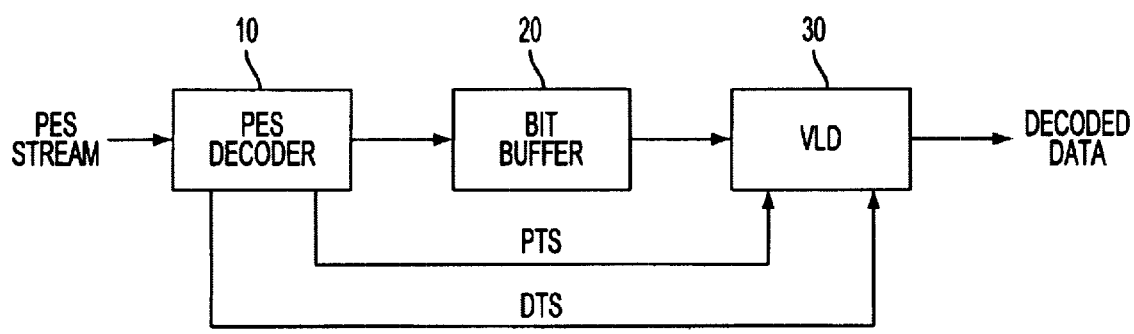
FIG. 1 is a block diagram of a video decoder for describing a conventional picture decoding synchronizing circuit.
Figure 2:
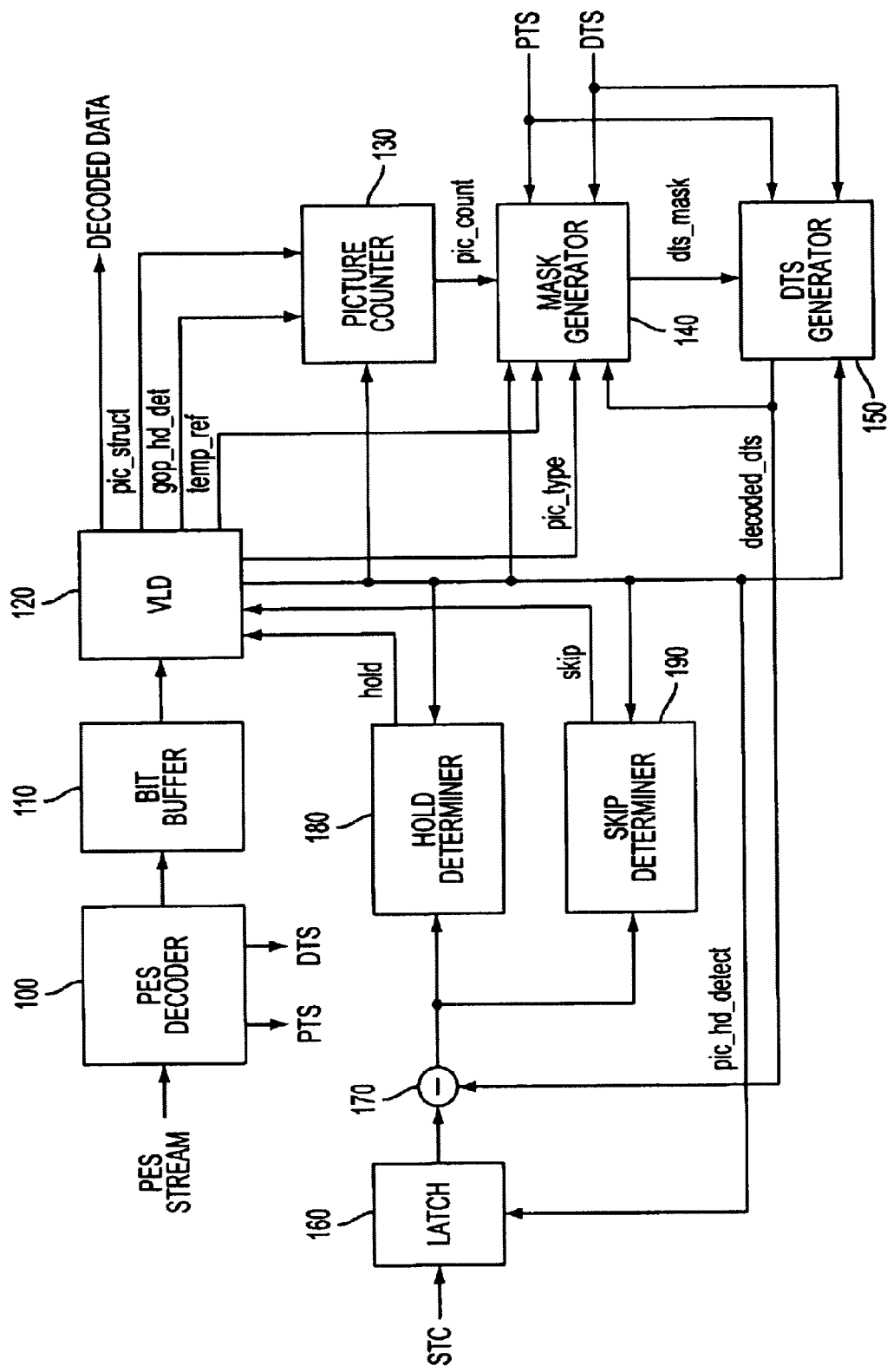
FIG. 2 is a block diagram of a picture decoding synchronizing circuit according to an embodiment of the present invention.

In FIG. 2, when a packetized elementary stream (PES) is input to a PES decoder 100, the PES decoder 100 parses the PES stream, selects only the PES packet corresponding to a video elementary stream, removes the header of the selected PES packet, and outputs a video elementary stream. The video elementary stream is written to a bit buffer 110 and is read according to a hold signal and a skip signal, which will be described below.

A variable length decoder (VLD) 120 outputs the signals defined by an MPEG-2 syntax, which are a picture structure (pic_struct) signal showing whether a transferred picture is a frame unit or a field unit, a group of pictures (GOP) header detect(gop_hd_det) signal for indicating that a GOP is detected, a temporal reference (temp_ref) information showing the order in which the pictures existing in the GOP are displayed, a picture type (pic_type) signal showing whether the pictures input to the VLD 120 are I picture, P picture, or B picture, and a picture header detect (pic_hd_det) signal indicating that a picture header is detected.

A picture counter 130 receives the picture structure (pic_struct) signal, the GOP header detect (gop_hd_det) signal, and a picture header detect (pic_hd_det) signal and counts them in units of a picture. Namely, counting is performed in synchronization with the picture header detect (pic_hd_detect) signal. If the picture structure (pic_struct) signal is "3" (referring to a frame picture), the count value is incremented when every picture header detect(pic_hd_detect) signal is detected. If the signal (pic_struct) does not correspond to a picture unit structure, but rather corresponds to a field structure, the count value is incremented when every two picture header detect (pic_hd_detect) signals are detected. Also, the picture counter 130 is synchronized with the picture header 10 detect (pic_hd_detect) signal and resets the count value to "0" when the GOP header detect (gop_hd_detect) signal is input. Namely, the picture counter 130 is reset every GOP unit and counts the number of pictures in the GOP.

A DTS generator 150 generates decoded DTS (decoded_dts) values used for decoding in the VLD 120 using the DTS and the PTS parsed by the PES decoder 100 and a DTS mask (dts_mask) signal generated by a mask generator 140, and latches it according to the picture header detect (pic_hd_detect).signal output from the VLD 120.

The mask generator 140 generates the DTS mask (dts_mask) signal using the picture type (pic_type) signal and the temporal reference (temp_ref) information output from the VLD 120, the picture count (pic_count) value counted in the picture counter 130 and the decoded DTS (decoded_dts) value generated by the DTS generator 150. The condition of the DTS mask (dts_mask) signal indicates whether an error is generated in the transferred PTS or DTS. The signal dts_mask is active from the point in time at which an error is generated in the transferred PTS or DTS to the point in time at which the first picture (the I picture) of the GOP in which errors are not generated in the transferred PTS and DTS. This will be described in more detail with reference to FIG. 4.

Since the decoded DTS (decoded_dts) value of the current picture is latched according to the picture header detect (pic_hd_detect) signal in the DTS generator 150, it is determined whether the DTS mask (dts_mask) signal is to be set or reset in the mask generator 140 after the picture header detect (pic_hd_detect) signal is detected and after a delay of one or two clock cycles.

The decoded DTS (decoded_dts) value generated in this way is applied to a subtracter 170. A latch 160 latches a system time clock (STC) increasing at a rate of 90 KHz per second (synchronized with a program clock reference (PCR) loaded in the header of a transport packet stream). The subtracter 170 subtracts the decoded DTS (decoded_dts) value from the STC value latched in the latch 160, compares the absolute of the subtracted result with a threshold value, and outputs the compared result to a hold determiner 180 and a skip determiner 190. Here, the threshold value is a predetermined constant (900) and is a limiting value showing the range within which a hold or a skip is allowed.

The hold determiner 180 generates a hold signal for commanding the variable length decoder not to continue present decoding and to hold processing, on the basis of the compared result. A hold signal is output to the VLD 120. The skip determiner 190 generates a skip signal for commanding the variable length decoder not to decode the current picture and discard it, on the basis of the compared result. The skip signal is output to the VLD 120.

The point in time at which the hold determiner 180 and the skip determiner 190 must determine whether the current picture is to be held or skipped is the point in time at which a plurality of clocks are delayed after the picture header detect (pic_hd_detect) signal is detected. At this point in time, the hold signal or the skip signal is generated.

A method for determining whether the PTS or the DTS parsed in the PES decoder 100 is distorted by an error, and a method for decoding a picture in synchronization with the DTS value determined in units of a picture, without generating overflow or underflow in the bit buffer 110, and decoding pictures in the VLD 120 using the DTS of a picture unit determined according to whether the PTS or DTS have an error, will be described with reference to FIGS. 3 and 4. In the present invention, when the PTS or the DTS is found to be distorted by error, the parsed PTS and DTS values will not be used. Rather, an approximated DTS value will be used based on a DTS value for a previous picture and an offset value.

The above components of the synchronizing apparatus can be implemented by one skilled in the art using software components operating with known hardware devices.

First, there is the following relationship between the PTS and the DTS, transferred as part of the header of the PES. The DTS is detected in the PES header and shows when the picture corresponding thereto is to be decoded on the video elementary stream which is the output of the PES decoder 100. The PTS is detected from the PES header and shows when the picture corresponding thereto is to be displayed on a screen. The PTS is necessary since the displaying order is different from the decoding order, according to the kind of picture (I, B, or P).

The relationship between the DTS and the PTS is determined by the following rules. The relationship between the DTS and the PTS of I and P pictures is variable according to the number of B pictures. The DTS and the PTS are identical in the B picture. The DTS increases with a certain offset in every picture. The offset value is related to the frame rate of the decoded elementary bit stream. For example, when the frame rate is 30, the offset is 90,000/30, i.e., 3,000. Here, 90,000 denotes the 90 KHz clock used in a video encoder, which is not shown. When the DTS is determined, the PTS is determined by the following equation 1.

$$PTS = N + (\text{temporal reference} + 1) \times \text{offset} \qquad [\text{Equation 1}]$$

wherein the offset is 3,000 and N represents the DTS value of the first picture. The temporal reference represents the order in which the pictures existing in the GOP are displayed.

Figure 3:
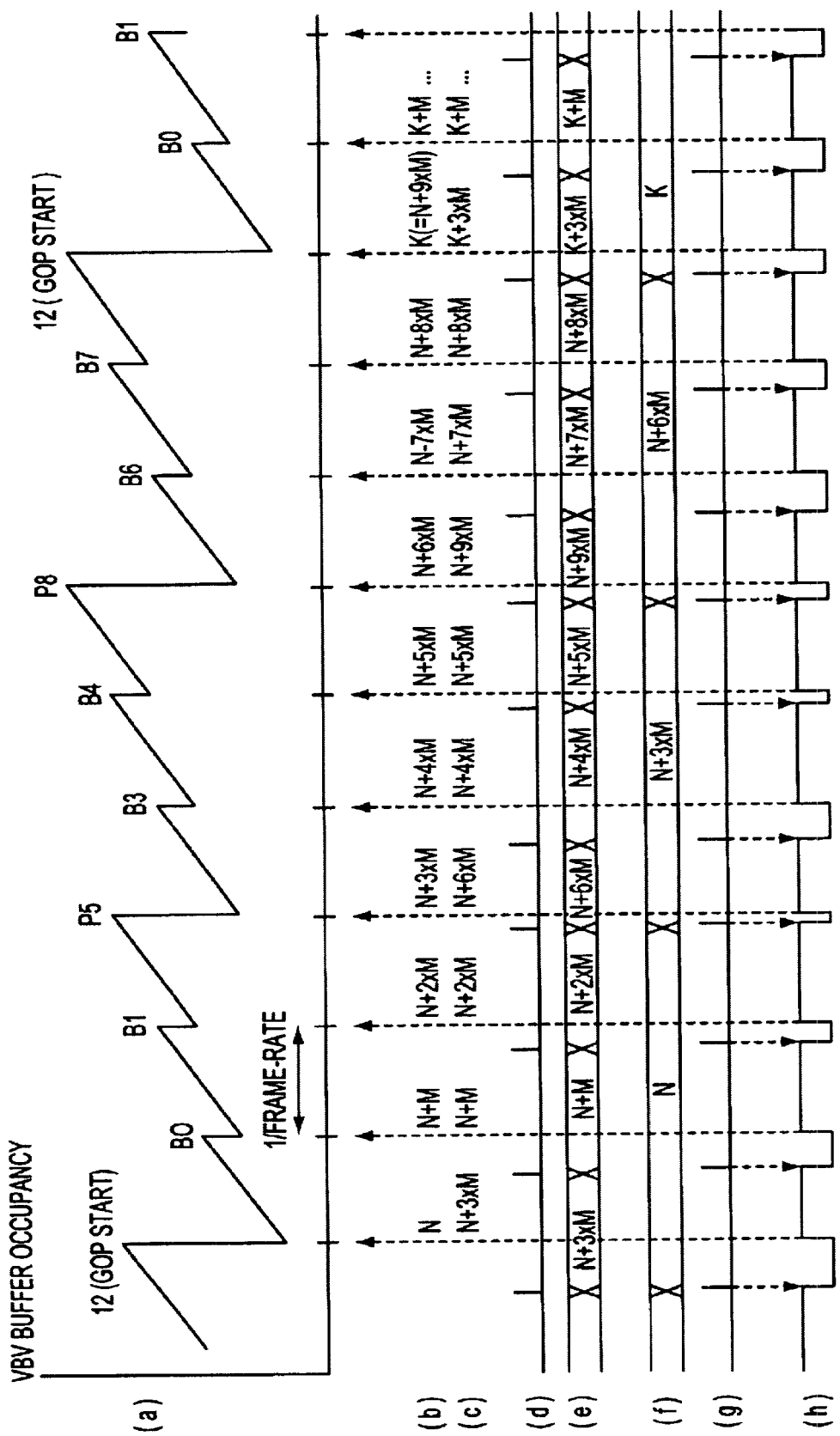
FIG. 3 shows a state of the operation of the picture decoding synchronizing circuit shown in FIG. 2 when the PTS and the DTS are undamaged.

For example, when nine pictures exist in an arbitrary GOP and two B pictures exist between the reference pictures (I or P pictures) as shown in FIG. 3(*a*), the temporal reference information is 2 0 1 5 3 4 8 6 7. Here, FIG. 3(*a*) shows the occupancy of data according to the order in which pictures are input to the bit buffer 110. In "I2", I and 2 respectively denote an I picture and the temporal reference information.

FIGS. 3(*b*) and 3(*c*) respectively show the DTS and the PTS determined in the video encoder with respect to arbitrary pictures. For example, when the DTS of the I picture (which is the first picture of the GOP) is N, the DTS of the P5 picture becomes N+3×M and the PTS becomes N+6×M.

In FIGS. 3(d) through 3(h) the picture is ideally decoded by the VLD 120 in synchronization with the DTS when there is no error in the transferred bit stream, namely, there are no errors in the PTS and the DTS.

In the video encoder, the PTS and the DTS are all transferred in the video encoder only when the values thereof are different from each other in an arbitrary picture. Only the PTS is transferred when the values are equal. Therefore, the DTS is not transferred with respect to the B picture. However, the DTS cannot be transferred without the PTS. The PTS and the DTS do not have to be transferred in every picture. According to the MPEG-2 specification, they only have to be transferred at least once every 0.7 sec.

The picture header detect (pic_hd_det) signal shown in FIG. 3(d) is generated when the decoding of the picture headers is completed in the VLD 120. The PTS and the DTS parsed by the PES decoder 100 shown in FIGS. 3(e) and 3(f) are latched according to the picture header detect (pic_hd_det) signal in the DTS generator 150.

An elementary picture decoding method in a normal state in which there are no errors in the PTS and the DTS is as follows. When the PTS and the DTS of an arbitrary picture are both transferred, the DTS generator 150 determines the transferred DTS to be the DTS of the picture. When only the PTS is transferred, the DTS generator 150 determines the PTS to be the DTS and generates the decoded DTS (decoded_dts) value. However, with respect to the picture not having the PTS and the DTS, the DTS generator 150 determines the value obtained by adding the DTS of the previous picture to the offset as the DTS of the present picture and outputs the decoded DTS (decoded_dts) value. As a result, the finally determined DTS is the same as the DTS determined in the video encoder shown in FIG. 3(b).

Also, the latch 160 latches the STC increasing at the rate of 90 KHz per second in synchronization with the program code reference (PCR) included in the header of a transport stream (TS) by the picture header detect (pic_hd_det) signal. The subtracter 170 subtracts the decoded DTS value from the latched STC value. When the value is negative, the decoding in the VLD 120 is delayed. When the value is positive, the current picture is not decoded and is discarded.

The subtracter 170 also determines whether the result obtained by subtracting the decoded DTS value from the STC value is larger than a threshold value (900). For this, the absolute value of the subtraction result is obtained, the absolute value is subtracted from the threshold value, and it is determined whether the result is negative or positive. When the value is positive, since the absolute value is smaller than the threshold value, no hold or skip is generated depending on the result of STC-DTS. When the value is negative, a hold or skip may be generated. After subtracting the absolute value from the threshold value, it is determined whether the skip signal for skipping the current picture or the hold signal for delaying the current picture is to be generated at the point in time (FIG. 3(g)) at which the picture header detect (pic_hd_det) signal is delayed by a predetermined number of clock cycles.

When a hold signal of logic "low" is generated by the hold determiner 180 as shown in FIG. 3(h) at the point in time (FIG. 3(g)) a predetermined number of clock cycles after the picture header detect (pic_hd_det) signal, on the basis of the output of the subtracter 170, the decoding of the input picture is delayed in the VLD 120. When the skip signal is generated by the skip generator 190 after a delay of a determined number of clock cycles from the picture header detect (pic_hd_det) signal, on the basis of the output of the subtracter 170, the VLD 120 does not decode and discards the current pictures input when the skip signal is generated. In FIG. 3, the hold is generated for every picture.

When the VLD 120 completes the decoding of a picture within an offset period, the value obtained by subtracting the decoded DTS value from the STC value is negative. When the absolute value of the subtraction result is outside the range of the threshold value, the VLD 120 generates the hold signal and controls the decoding period of a picture to 1/picture rate. On the other hand, when the VLD 120 does not complete the decoding of a picture within an offset period, the value obtained by subtracting the decoded DTS value from the STC value is positive. When the absolute value of the subtraction result is outside the range of the threshold value, the VLD 120 generates the skip signal, and does not decode the picture but instead discards it.

So far, a method has been described of synchronizing the decoding of the picture unit in the VLD using the PTS and the DTS in a normal state. From now on, a picture decoding synchronizing method using the PTS and the DTS including errors, which is the purpose of the present invention, will be described.

The transferred PTS and DTS may not be detected by the PES decoder 100 due to errors. Also, the transferred PTS and DTS may be detected in the PES decoder 100, but erroneously, due to errors.

In the former case, when the picture of the elementary stream corresponding to the undetected PTS and DTS is not damaged by errors, the VLD 120 determines that there is no time stamp in the picture and decodes the picture using the value obtained by adding the DTS of the previous picture to the offset value as the DTS of the picture. When the picture is discarded by the VLD 120 due to error, the hold is generated in the picture corresponding to the PTS and the DTS according to the PTS and the DTS found in the successive picture, so only as many pictures are undetected by the VLD 120 are not decoded.

However, in the latter case, the problem is serious if the transferred PTS and DTS are much larger than the original value. Since the PTS and the DTS have the value of 33 bits, though the PTS and DTS is one bit which is close to the most significant bit (MSB), if the PTS and DTS which is "0" is wrongly detected as "1", there exists a very big difference between the threshold value and the value obtained by subtracting the decoded DTS value from the STC value in the subtracter 170. The decoding can be held for a long time. When the transferred PTS and DTS are smaller than the original value, though the value obtained by subtracting the decoded DTS value from the STC value is very large, the pictures are skipped until the PTS and the DTS are found. Accordingly, the PTS and DTS are not seriously affected.

In the present invention, the temporal reference information (temp_ref), the picture counter 130, the mask generator 140, and the DTS generator 150 are used as shown in FIG. 2 to provide synchronization in the case in which the transferred PTS and DTS are much larger than the original value, as in the latter case. The picture counter 130 performs counting in synchronization with the picture header detect (pic_hd_det) signal output from the VLD 120. The picture counter 130 is reset to "0" at the first picture in the GOP and increases by "1" at other pictures.

The relationship established among the PTS, the DTS, the temporal reference information, and the output of the picture counter in a GOP is shown in the following equations 2 and 3.

$$\text{PTS} = \text{transferred DTS} + (\text{temporal reference} - \text{picture count value} + 1) \times \text{offset} \quad \text{[Equation 2]}$$

$$\text{transferred DTS} = \text{previous DTS} + \text{offset} \quad \text{[Equation 3]}$$

When the picture input to the VLD 120 is an I or P picture, and the condition of equation 2 is not satisfied, this indicates the presence of an error. When the picture input to the VLD 120 is a B picture, and the condition of equation 3 is not satisfied, this also indicates the presence of an error. Namely, when the current input picture does not satisfy the condition of equations 2 or 3, the PTS and the DTS transferred from the current input picture to the final picture of the GOP are not used. Also, when the first picture of the successive GOP is an I picture, the PTS and the DTS exist, and the above conditions are not satisfied, the PTS and the DTS continuously transferred to the GOP are not used. Namely, the PTS and the DTS transferred to all the pictures are discarded until the first picture of the GOP satisfying the conditions is found.

According to the MPEG specification, the first picture of the GOP is an I picture. In an I picture, if a time stamp exists, then the PTS and the DTS must also exist. In FIG. 4, such a relationship is described, employing arbitrary numbers. The transferred PTS and DTS are not detected in the PES decoder 100 due to the errors. The bits of the pictures corresponding to the PTS and the DTS are discarded in the VLD 120 due to the errors.

Figure 4:
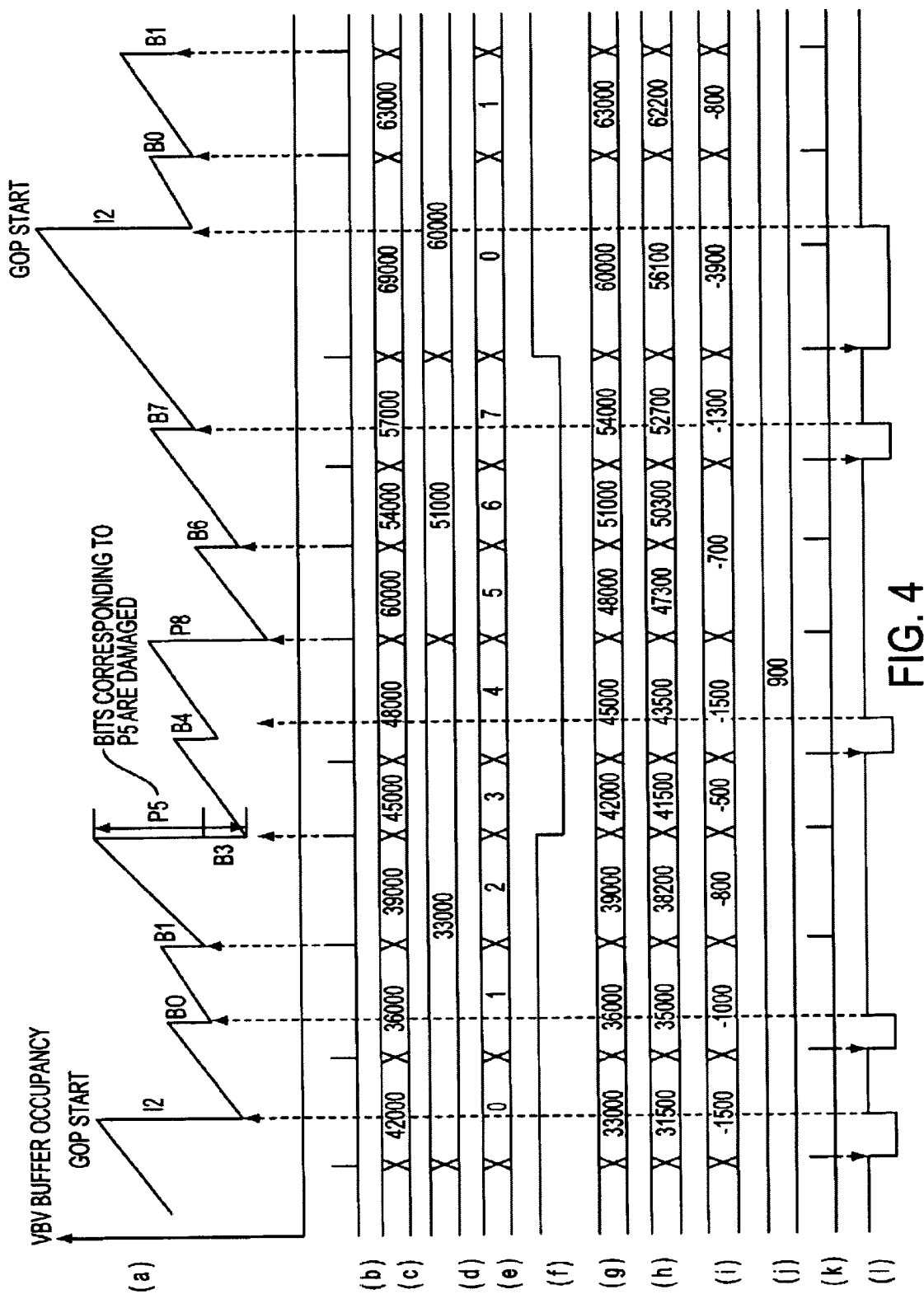
FIG. 4 shows a state of the operation of the picture decoding synchronizing circuit shown in FIG. 2 when there are errors in the PTS and the DTS.

Namely, as shown in FIG. 4(*a*), the PTS and the DTS of the pictures corresponding to P5 are not transferred and 5 the bits are damaged and discarded in the VLD 120. The PTS of the following B3 picture is detected and the picture header corresponding to the picture is detected. The picture header detect (pic__hd__det) signal is generated as shown in FIG. 4(*b*).

Since the transferred PTS is 45,000 as shown in FIG. 4(*c*) and the picture is a B picture, the DTS generator 150 interprets the PTS as the DTS value. FIG. 4(*d*) shows the transferred DTS. FIG. 4(*e*) shows the value obtained by counting the pictures in the picture counter 130 according to the picture structure (pic__struct) signal and the picture header detect (pic__hd__det) signal output from the VLD 120.

Since the DTS value decoded by the DTS generator 150 with respect to the B3 picture does not satisfy the condition of equation 3, the mask generator 140 generates the DTS mask signal (dts__mask) shown in FIG. 4(*f*) as an active signal of logic "low". The DTS mask (dts__mask) signal is maintained in the logic "low" state until the first I picture of the successive GOP satisfies all the conditions of equations 2 and 3. When the DTS mask (dts__mask) signal is in the logic "low" state, the value obtained by adding the DTS of the previous picture to the offset is used as the decoded DTS value whenever the picture header detect signal is found, without employing the transferred PTS or DTS. In this case, the previous picture is a B picture, and the PTS 39,000 is used as the DTS and an offset of 3000 is added. Therefore, the DTS generator 150 outputs the decoded DTS (decoded__dts) value as shown in FIG. 4(*g*).

In the following GOP, when the PTS and the DTS of the first I picture satisfy the conditions of equations 2 and 3, the DTS mask (dts__mask) signal is logic "high" in the first I picture of the GOP. The transferred DTS of the first I picture is decoded as the DTS of the I picture. The VLD 120 performs decoding, holding, or skipping in units of a picture, according to the value obtained by subtracting the decoded and approximated DTS value from the STC value and the threshold value when the DTS mask (dts__mask) signal is logic "low". When the DTS mask (dts__mask) signal shown in FIG. 4(*f*) is logic "high", the I picture is held as much as the absolute value of the value (−3900 in FIG. 4(*i*)) obtained by subtracting the decoded DTS value (60,000 in FIG. 4(*g*)) from the STC value (56,100 in FIG. 4(*h*)). This is because the value obtained by subtracting the decoded DTS value from the STC value becomes larger than the number of pictures discarded due to the errors in the VLD 120 (1(P5) in FIG. 4)×the offset (−3,900 in FIG. 4(*i*)).

FIG. 4(*h*) shows the STC value latched by the latch 160 according to the picture header detect (pic__hd__det) signal. FIG. 4(*i*) shows the value obtained by subtracting the DTS value decoded by the DTS generator 150 from the STC value latched in the latch 160. FIG. 4(*j*) shows the threshold value (900).

Since the VLD 120 completes decoding all the pictures in a GOP within 3,000, which is the offset value, the value obtained by subtracting the decoded DTS value from the STC is negative as shown in FIG. 4(*i*). If the absolute value of the subtraction result is outside the range of the threshold value at the determining point in time shown in FIG. 4(*k*), the skip or hold is generated. If not, the decoding is continuously performed. In FIG. 4(*l*), the VLD 120 temporarily stops when the hold signal of logic "low" is generated by the hold determiner 180.

In the present invention, even when there are errors in the transferred DTS and PTS, the decoded image data displayed naturally on a screen.

What is claimed is:

1. A picture decoding synchronizing circuit, comprising:
   a detector for detecting whether at least one of a presentation time stamp (PTS) and a decoding time stamp (DTS) which are transferred through an input bit stream is distorted by an error, and outputting a detect signal;
   a determiner for determining an actual DTS value using a transferred PTS and DTS if no errors are detected from the transferred PTS and DTS according to the detect signal, and determining an approximated DTS value using the value obtained by adding a DTS value of a previous picture to a predetermined offset value, if an error is detected in at least one of said PTS and said DTS; and
   a decoder for decoding the input bit stream in units of a picture, in synchronization with one of the actual DTS value and the approximated DTS value.

2. The picture decoding synchronizing circuit of claim 1, wherein the detector comprises:
   a picture counter for counting a number of pictures in a group of picture (GOP) unit and outputting a picture count value; and
   a generator for detecting an error generated in at least one of the transferred DTS and PTS using a picture type signal showing whether an input picture is an I (intra-coded), B (bidirectionally predictive-coded), or P (predictive-coded) picture, temporal reference information showing a display order of the pictures in the GOP, and the picture count value, and generating the detect signal.

3. The picture decoding synchronizing circuit of claim 2, wherein the detector detects whether the PTS of input I and P pictures satisfies a PTS condition and, if not, generates the detect signal, wherein the PTS condition is:

PTS=transferred DTS+(temporal reference information−picture count value+1)×offset.

4. The picture decoding synchronizing circuit of claim 2, wherein the detector detects whether the DTS of the input B picture satisfies a DTS condition and, if not, generates the detect signal, wherein the DTS condition is:

transferred DTS=previous DTS+offset.

5. The picture decoding synchronizing circuit of claim 1, wherein the detector generates the detect signal which is active from a current picture to a first picture of the GOP in which no errors are detected in the transferred PTS and DTS, when an error is detected in at least one of the PTS and DTS of the current picture.

6. A picture decoding synchronizing circuit, comprising:
an extractor for extracting a video elementary stream, a presentation time stamp (PTS), a decoding time stamp (DTS), and a system time clock (STC) from a transferred bit stream;
a buffer for temporarily storing the video elementary stream;
a variable length decoder for controlling the decoding of the video elementary stream stored in the buffer so that the buffer does not overflow or underflow, parsing a header of the video elementary stream, and outputting temporal reference information, a picture structure signal, a GOP header detect signal, a picture header detect signal, and a picture type signal; and
a decoding controller for determining whether an error is generated in at least one of the DTS and the PTS and generating control signals for controlling the decoding using a determined DTS value by adding a DTS of a previous picture to an offset value, if an error is generated in at least one of the DTS and the PTS.

7. The picture decoding synchronizing circuit of claim 6, wherein the decoding controller comprises:
a picture counter which is reset according to the GOP header detect signal, for counting a number of pictures according to the picture structure signal and the picture header detect signal, and outputting a picture counted value;
a first means for determining whether there is an error in at least one of the DTS and the PTS using the picture type signal, temporal reference information, and the picture counted value and generating a mask signal;
a second means for generating an approximated DTS value as a decoded DTS value by adding the DTS value of the previous picture to the offset value, if the mask signal is generated and otherwise, generating an actual DTS value as the decoded DTS value on the basis of the transferred PTS and DTS;
a subtracter for subtracting the decoded DTS value from the STC value, comparing the absolute value of the subtraction result with a threshold value, and outputting a comparison result;
a hold determiner for generating a hold signal commanding the variable length decoder not to proceed presently according to the comparison result and to hold, and outputting the hold signal to the variable length decoder; and
a skip determiner for generating a skip signal commanding the current picture to be discarded without being decoded, according to the comparison result, and outputting the skip signal to the variable length decoder.

8. The picture decoding synchronizing circuit of claim 7, wherein the first means generates the mask signal when the PTS of the input I and P pictures does not satisfy a PTS condition, wherein the PTS condition is:

PTS=transferred DTS+(temporal reference information−picture count value+1)×offset.

9. The picture decoding synchronizing circuit of claim 7, wherein the first generator generates the mask signal when the DTS of the input B picture does not satisfy a DTS condition, wherein the DTS condition is:

transferred DTS=previous DTS+offset.

10. The picture decoding synchronizing circuit of claim 7, wherein the first means generates the mask signal which is active from a current picture to a first picture of the GOP in which no errors are generated in the transferred PTS and DTS, when an error is generated in at least one of the PTS and the DTS of the current picture.

11. The picture decoding synchronizing circuit of claim 7, wherein the point in time at which it is determined whether the hold signal or the skip signal is to be generated in the hold determiner and the skip determiner is a predetermined number of system clock cycles after the picture header detect signal.

12. A picture decoding synchronizing method, comprising the steps of:
(a) determining whether at least one of a presentation time stamp (PTS) and a decoding time stamp (DTS), transferred through an input bit stream, are distorted;
(b) determining an actual DTS value using a transferred PTS and the DTS if no errors are detected in the transferred PTS and DTS, according to a detect signal, and otherwise, determining an approximated DTS value by adding a DTS value of a previous picture to an offset value; and
(c) decoding the input bit stream in units of a picture, in synchronization with at least one of the actual DTS value and the approximated DTS value.

13. The picture decoding synchronizing method of claim 12, wherein the step (a) comprises the steps of:
(a1) counting a number of pictures in a group of picture (GOP) unit and outputting a picture count value; and
((a2) detecting an error generated in at least one of the transferred DTS and PTS using a picture type signal showing whether an input picture is an I (intra-coded), B (bidirectionally predictive-coded), or P (predictive-coded) picture, temporal reference information showing a display order of the pictures in the GOP, and a picture count value and generating the detect signal.

14. The picture decoding synchronizing method of claim 13, wherein it is detected whether the PTS of an input I or P picture satisfies a PTS condition, and the detect signal is generated in the step (a2), wherein the PTS condition is:

PTS=transferred DTS+(temporal reference information−picture count value+1)×offset, the detect signal being generated when the PTS condition is not met.

15. The picture decoding synchronizing method of claim 13, wherein it is detected whether the DTS of an input B pictures satisfies a DTS condition, and the detect signal is generated in the step (a2), wherein the DTS condition is:

transferred DTS=previous DTS+offset, the detect signal being generated when the DTS condition is not met.

16. The picture decoding synchronizing method of claim 12, wherein the detect signal is generated which is active from a current picture to a first picture of the GOP in which no errors are generated in the transferred PTS and DTS, when an error is generated in at least one of the PTS and the DTS of the current picture to cause distortion in the step (a).

17. A picture decoding synchronizing method, comprising the steps of:
(a) extracting a video elementary stream, a presentation time stamp (PTS), a decoding time stamp (DTS), and a system time clock (STC);

(b) controlling the decoding of the video elementary stream, parsing the header of the video elementary stream, and detecting temporal reference information, a picture structure signal, a GOP header detect signal, a picture header detect signal, and a picture type signal; and (c) determining whether an error is generated in at least one of the DTS and the PTS, and when an error is generated, generating control signals for controlling the decoding using a DTS value determined by adding a DTS of a previous picture to an offset value.

18. The picture decoding synchronizing method of claim 17, wherein the step (c) comprises the steps of:

(c1) counting the number of pictures in a group of pictures (GOP) according to the picture structure signal, the picture header detect signal, and the GOP header detect signal and outputting a picture count value;

(c2) determining whether an error is generated in at least one of the DTS and the PTS using the picture type signal, the temporal reference information, and the picture count value, and generating a mask signal;

(c3) generating a decoded DTS value by adding the DTS value of the previous picture to the offset value if the mask signal is generated, and otherwise, generating the decoded DTS value on the basis of the transferred PTS and DTS;

(c4) subtracting the decoded DTS value from the STC value, comparing the absolute value of the subtraction result with a threshold value and outputting a comparison result;

(c5) generating a hold signal commanding the decoding not to proceed presently and to hold according to the comparison result; and (c6) generating a skip signal commanding the current picture to be discarded without being decoded, according to the comparison result.

19. The picture decoding synchronizing method of claim 18, wherein when the PTS of input I and P pictures does not satisfy a PTS condition, the mask signal is generated in the step (c2), wherein the PTS condition is:

$$PTS = \text{transferred DTS} + (\text{temporal reference information} - \text{picture count value} + 1) \times \text{offset}.$$

20. The picture decoding synchronizing method of claim 18, wherein when the DTS of an input B picture does not satisfy a DTS condition, the mask signal is generated in the step (c2), wherein the DTS condition is:

$$\text{transferred DTS} = \text{previous DTS} + \text{offset}.$$

21. The picture synchronizing method of claim 17, wherein the mask signal is generated from a current picture to a first picture of the GOP in which no errors are generated in the transferred PTS and DTS when errors are generated in the PTS and the DTS of the current picture, in the step (c2).

* * * * *